(12) United States Patent
Uzkan

(10) Patent No.: US 6,499,298 B2
(45) Date of Patent: Dec. 31, 2002

(54) LOCOMOTIVE ENGINE COOLING SYSTEM AND METHOD

(75) Inventor: Teoman Uzkan, Indian Head Park, IL (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 09/817,358

(22) Filed: Mar. 21, 2001

(65) Prior Publication Data

US 2002/0174653 A1 Nov. 28, 2002

(51) Int. Cl.[7] ................................................ F02B 29/04
(52) U.S. Cl. ...................... 60/599; 123/563; 123/41.29; 123/41.31; 123/41.44
(58) Field of Search ............................ 60/599; 123/563, 123/41.29, 41.31, 41.44, 41.51

(56) References Cited

U.S. PATENT DOCUMENTS

| | | | | |
|---|---|---|---|---|
| 3,397,684 A | * | 8/1968 | Scherenberg | ................. 60/599 |
| 5,201,285 A | * | 4/1993 | McTaggart | ............... 123/41.31 |
| 5,215,044 A | * | 6/1993 | Banzhaf et al. | ........... 123/41.29 |
| 5,353,757 A | * | 10/1994 | Susa et al. | ................ 123/41.29 |
| 5,415,147 A | * | 5/1995 | Nagle et al. | ................... 60/599 |
| 5,598,705 A | | 2/1997 | Uzkan | .......................... 60/599 |
| 5,910,099 A | | 6/1999 | Jordan, Jr. et al. | ............ 60/599 |
| 6,006,731 A | | 12/1999 | Uzkan | ......................... 123/563 |
| 6,178,928 B1 | * | 1/2001 | Corriveau | ................ 123/41.44 |
| 6,230,668 B1 | * | 5/2001 | Marsh et al. | ............. 123/41.44 |

* cited by examiner

Primary Examiner—Thomas Denion
Assistant Examiner—Thai-Ba Trieu
(74) Attorney, Agent, or Firm—Cary W. Brooks

(57) ABSTRACT

Modified locomotive engine cooling systems are designed to reduce engine emissions and improve engine efficiency. The systems include separate main engine and turbocharger aftercooler coolant loops that are joined when extra engine cooling is required. Studies determined that by reducing and optimizing the aftercooler loop coolant flow rate, the amount of heat transfer from the engine inlet air to the radiator cooling air could be increased. Thus, a significant increase in aftercooling could be obtained by reducing the coolant temperature at the inlet of the aftercooler and this could be accomplished by reducing the rate of flow of coolant in the aftercooler loop. This improvement and how it may be applied in practice are fundamental features of the cooling system and method.

9 Claims, 4 Drawing Sheets

LOCOMOTIVE ENGINE COOLING SYSTEM AND METHOD

TECHNICAL FIELD

This invention relates to cooling apparatus for a locomotive engine and a method for operating the cooling apparatus.

BACKGROUND OF THE INVENTION

Most modern railway road locomotives are of a diesel-electric type in which a diesel engine drives electrical generating apparatus to power electric motors that drive the locomotive wheels. The engine is typically turbocharged and includes one or more aftercoolers to remove some of the heat of compression from the turbocharged air before it enters the engine. An engine cooling system circulates liquid coolant through an engine coolant loop to remove heat from the engine and through an aftercooler coolant loop to remove heat from the aftercooler.

U.S. Pat. No. 5,598,705, Turbocharged Engine Cooling Apparatus, issued Feb. 4, 1997 describes cooling apparatus for a diesel-electric locomotive which employs separate engine and aftercooler coolant loops, each with its own radiator and pump apparatus and separate coolant conduits but sharing a single coolant tank. The loops are also connected by a linking conduit connecting the outlet of the aftercooler radiator with the inlet of the engine coolant pump. A valve in the linking conduit can be closed to prevent linking coolant flow; and the system is designed to operate in that manner under normal conditions, with the engine radiator and conduits sized to provide sufficient cooling for the engine and optional oil cooler in normal warmed up operation while the aftercooler radiator provides cooling of the turbocharged air for maximum fuel economy and low emissions. The engine radiator is not designed to provide sufficient engine cooling for extremely hot running conditions, but the valve can be opened as necessary in such conditions to admit low temperature coolant from the aftercooler coolant loop to the engine cooling loop for extra engine cooling, with return flow through the coolant tank.

U.S. Pat. No. 6,006,731, issued Dec. 28, 1999, discloses a modification in which the valved (third) linking conduit is moved to connect the engine coolant loop between the engine and engine radiator with the aftercooler coolant loop between the aftercooler and the aftercooler radiator. An additional (first) linking conduit bypassing the linking valve is also provided to pass some of the engine coolant through the aftercooler radiator at all times, leaving the linking valve to control additional linking flow as needed. Return flow from the aftercooler coolant loop to the engine coolant loop passes through a second linking conduit located as before between the radiators and their respective pumps and may pass through the coolant tank.

The radiators are arranged in two banks disposed in V orientation in a cooling chamber of the locomotive body. The banks are of equal cooling capacity, one bank connected in the main engine cooling loop and the other bank connected in the aftercooler cooling loop, but also providing a portion of the engine cooling. Electrically driven cooling fans are provided for drawing ambient cooling air through both radiator banks. The fan speeds and the operation of a linking valve controller may be controlled by a computer to maintain fuel economy and emissions at desired levels.

SUMMARY OF THE INVENTION

The present invention provides a further modified locomotive engine cooling system designed to further reduce engine emissions and improve engine efficiency. The concept is drawn from a recognition that aftercooling is a method that is capable of reducing both engine emissions and engine fuel consumption at the same time. A study of how aftercooling could be increased or optimized showed that the prior aftercooler systems previously discussed have the capability to increase aftercooling capacity by optimizing the flow rate of the aftercooler coolant loop. As applied to these prior systems, it was determined that by reducing and optimizing the aftercooler loop coolant flow rate, the amount of heat transfer from the engine inlet air to the radiator cooling air could be increased. Thus, a significant increase in aftercooling could be obtained by reducing the coolant temperature at the inlet of the aftercooler and this could be accomplished by reducing the rate of flow of coolant in the aftercooler loop. This improvement and how it may be applied in practice are fundamental features of the cooling system and method of the present invention.

These and other features and advantages of the invention will be more fully understood from the following description of certain specific embodiments of the invention taken together with the accompanying drawings.

DESCRIPTION OF THE PREFERRED EMBODIMENT

Figure 1:
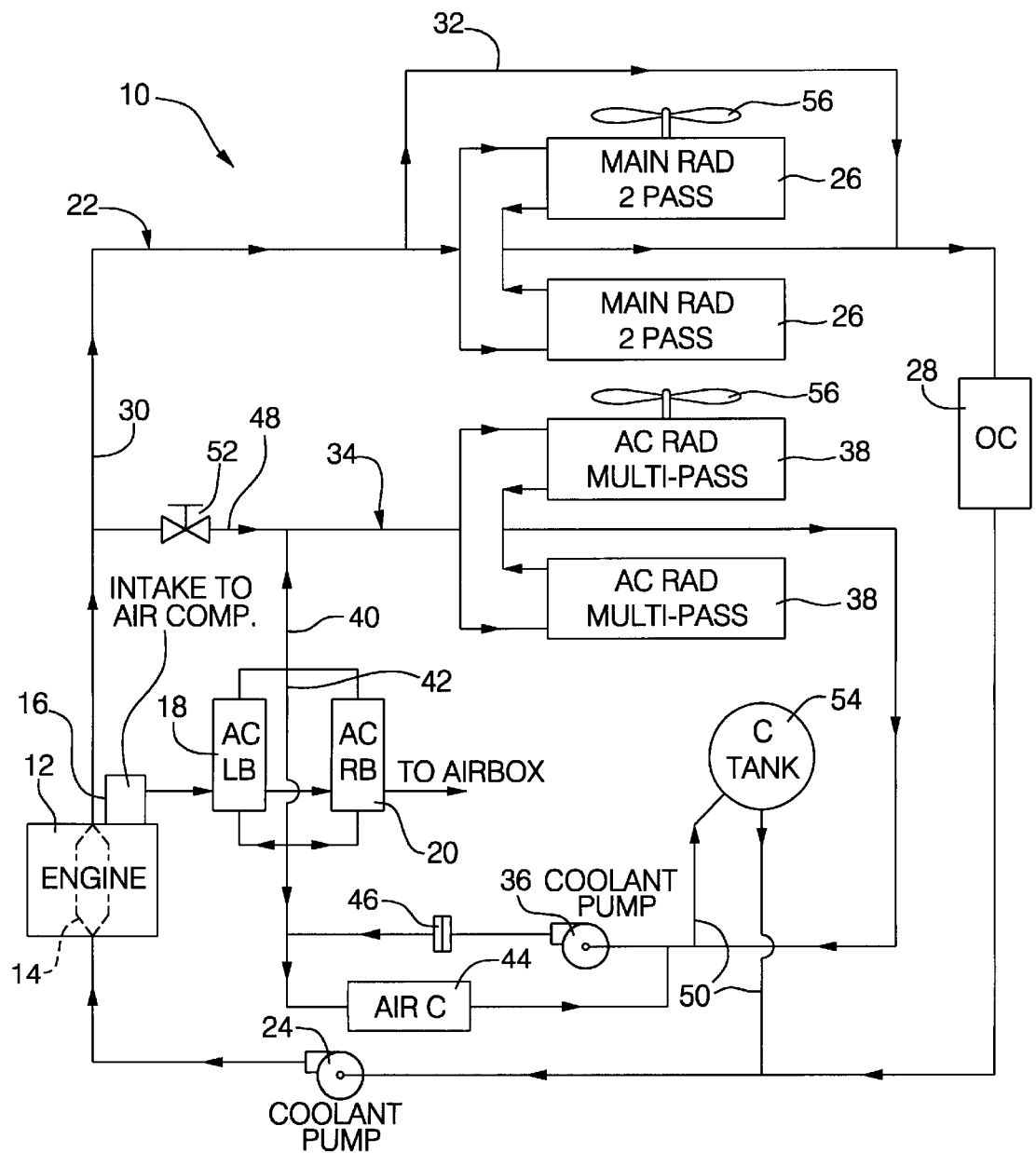
FIG. 1 is a schematic diagram showing the main components of a first embodiment of engine cooling system according to the invention.

Referring now to the drawings in detail, numeral 10 generally indicates in schematic form a first embodiment of engine cooling system for a railway locomotive. System 10 includes an engine 12 having internal coolant passages 14 for cooling the power developing components of the engine. The engine is turbocharged, the turbocharger including a dynamic intake air compressor 16 for compressing the engine intake air during operation. However, an engine driven compressor could be used if desired. Left bank and right bank aftercoolers 18, 20 cool intake air received from the compressor to remove some of the heat of compression before passing the air into the engine airboxes or other intake air plenums for the left and right cylinder banks of the engine.

The cooling system 10 includes a main engine coolant loop 22 having an engine driven main coolant pump 24, the engine 12, a pair of main radiators 26, and an optional oil cooler 28 connected in series by suitable conduit 30. An optional bypass conduit 32 is connected around the main radiators 26, which have two pass internal flow and are connected in parallel in the main coolant loop 22. A separate aftercooler coolant loop 34 includes an engine driven aftercooler coolant pump 36, the aftercoolers 18, 20 and a pair of aftercooler radiators 38 all connected in series by conduit 40. The aftercoolers are connected in parallel with one another and with an optional bypass line 42 in the aftercooler coolant loop 34. The aftercooler radiators are multipass units connected in parallel with one another. A locomotive air compressor 44 may be connected in an optional loop around the coolant pump 36. One or more orifices 46 or other bypasses may be located in either of the loops to control fluid pressures in the loops.

The separate coolant loops 22, 34 are interconnected by a first linking conduit 48 and a second linking conduit 50. First conduit 48 connects the engine 12 in the main coolant loop 22 with the aftercoolers 18, 20 in the aftercooler coolant loop 34. Second linking conduit 50 connects the radiators 38 in the aftercooler coolant loop 34 with the main coolant pump 24 in the main coolant loop 22. A linking valve 52 in the first linking conduit 48 is operable between closed and fully open positions, and optionally at any intermediate valve open positions, to respectively prevent or permit coolant flow from the engine 12 in the main loop 22 through the aftercooler radiators 38 in the aftercooler loop 34 and back to the main pump 24 in the main loop 22. A coolant tank 54 is provided and may be located in the second linking conduit 50 between the aftercooler radiators 38 and the main pump 24 in the first coolant loop 22.

Cooling fans 56 are provided for drawing ambient air through both the main and aftercooler radiators for removing heat from the coolant in both of the coolant loops. Controllable shutters, not shown, may also be provided at the inlet to a cooling chamber, not shown, in which the radiators are located to further control the cooling air flow through the radiators.

In operation, the cooling system is filled with coolant, usually treated water including corrosion inhibitors or a mixture of water and antifreeze. The coolant tank 54 provides a store of coolant connected to both the coolant loops 22, 34 to supply coolant to them as needed and receive excess coolant from them to accommodate expansion and contraction of the coolant during operation and after shutdown of the engine.

The main radiators may have cooling capacity the same as or different than the aftercooler radiators and the flow through the radiators may be controlled in any suitable manner, such as by varying size or speed of the coolant pumps or provision of the bypasses 32, 42 of the main loop 22 and aftercooler loop 34. The flow rate may also be varied by differentiating the resistance of two coolant loops, such as by sizing of the conduits or the use of orifices 46.

In the illustrated system, flow in the aftercooler loop is also reduced by providing four or eight pass flow though the aftercooler radiators as compared to two pass flow through the main radiators which normally supply cooling to the engine. In earlier cooling systems for similar locomotives, series connected single pass radiators were generally used for engine and aftercooler cooling. To meet the engine coolant flow requirements, the bypass conduit 32 carries excess coolant flow around the radiators 26. These radiators are able to provide the cooling needed for the engine at average ambient temperatures and maximum engine loads but cannot carry the full coolant flow needed in the engine. The system is designed so that the pump pressure and coolant flow in the main coolant loop 22 are both higher than in the aftercooler coolant loop 34. When the engine is operating in average ambient air temperatures up to maximum running power, the linking valve 52 remains closed and the coolant loops remain separate in operation. Increased flow resistance through the multipass aftercooler radiators causes reduced coolant flow through the aftercooler radiators. This results in increased heat rejection in the aftercooler radiators which deliver a lower temperature coolant to the aftercoolers 18, 20. This provides greater cooling of the compressed engine intake air, resulting in both lower exhaust emissions and reduced fuel consumption (increased economy). Desirably, the aftercooler loop flow rate is optimized to obtain the lowest possible coolant temperature into the aftercoolers that reduction of the coolant flow rate through the aftercooler radiators can provide with the available equipment.

When the engine 12 is operated at higher than average ambient temperatures, high power operation will require more cooling for the engine than the main coolant loop 22 can provide. The linking valve 52 is then opened partially or filly to allow some coolant from the engine to be diverted from the higher pressure coolant loop 22 to the aftercooler radiators 38 in the lower pressure aftercooler loop 34. The valve 52 may be adjusted so that excess cooling capacity of the aftercooler radiators is utilized to provide the additional cooling needed to maintain the engine coolant below its maximum temperature limit. In these conditions, the temperature of coolant provided to the aftercoolers is proportionally increased but the overall result is lower engine operating temperatures and improved emissions under most, if not all, operating conditions.

In order to evaluate the validity of the concepts embodied in the novel cooling system, the performance of cooling system 10 previously described was calculated with the substitution of four different aftercooler radiator arrangements using the same type radiator cores with headers for 8, 4, 2 and 1 pass flow. All other components of the system remained the same. After satisfying all other requirements of the system components, the final design characteristics of these four arrangements were compared to one another. Table A shows as the results of this comparison, the predicted performance of the same cooling system with 8, 4, 2 and 1 pass aftercooler radiators at full load and speed of the engine operating at 90 degrees F ambient air temperature, with linking valve 52 in the fully closed condition.

In table A, the columns 1, 2, 3 and 4 show the performance of the system with 8 pass, 4 pass 2 pass and single pass aftercooler radiators. They all have the same radiator cores except the flow arrangement is modified by different inlet and outlet header designs. The resulting flow areas are inversely proportional to the number of passes in the radiators. The pressure drop characteristics of the radiators are all calculated by the manufacturer's radiator performance design procedures.

In table A, the predicted main loop flow and heat characteristics are given on lines 10 through 13 of the table, indicating that the difference between these four cases is negligible.

TABLE A

| 1 Columns | 1 | 2 | 3 | 4 |
|---|---|---|---|---|
| 2 Radiators | 8 pass | 4 pass | 2 pass | 1 pass |
| 3 Aftercooler (AC) pump flow-gpm | 255.1 | 376.6 | 404.2 | 411.5 |
| 4 AC core flow, each-gpm | 60.12 | 64.06 | 71 | 70.33 |
| 5 AC radiator flow, each-gpm | 97.81 | 164.4 | 181.5 | 186.3 |
| 6 AC coolant in temp.-deg. F. | 123.1 | 128.6 | 133.6 | 149.2 |
| 7 AC coolant out temp.-deg. F. | 185.9 | 186.4 | 184.9 | 197.7 |
| 8 Temp. difference-deg. F. | 62.8 | 57.8 | 51.3 | 48.5 |
| 9 AC airout temp.-deg. F. | 127.9 | 132.7 | 137.1 | 152.5 |
| 10 Main coolant pump flow-gpm | 1121 | 1121 | 1121 | 1121 |
| 11 Engine flow-gpm | 1116 | 1116 | 1116 | 1116 |
| 12 Engine coolant out temp.-deg. F. | 192.4 | 192.5 | 192.8 | 193.8 |
| 13 Main radiator flow-gpm | 469.9 | 469.9 | 469.9 | 469.8 |
| 14 AC heat rejection-Btu/min | 62316 | 61133 | 59817 | 55780 |

The predicted aftercooler loop flow characteristics are shown in lines 4 and 5 in terms of the aftercooler core and aftercooler radiator flow rates respectively. They are both decreasing with an increase in the radiator pass number.

Lines 6 and 7 show the temperatures at the inlet and outlet of the aftercooler cores. They both decrease with an increase in radiator pass number. Moreover, line 8 shows that the difference between the inlet and outlet temperatures increases with an increase in the number of passes.

The critical information is found on lines 9 and 14. Line 9 shows the engine inlet air temperature at the outlet of the aftercooler core. This temperature decreases from 152.5 to 127.9 degrees F as the number of passes is increased. The heat transfer from the engine inlet air to the aftercooler loop coolant is increased from 55780 to 62316 Btu/min or about 11.7%.

Figure 2:
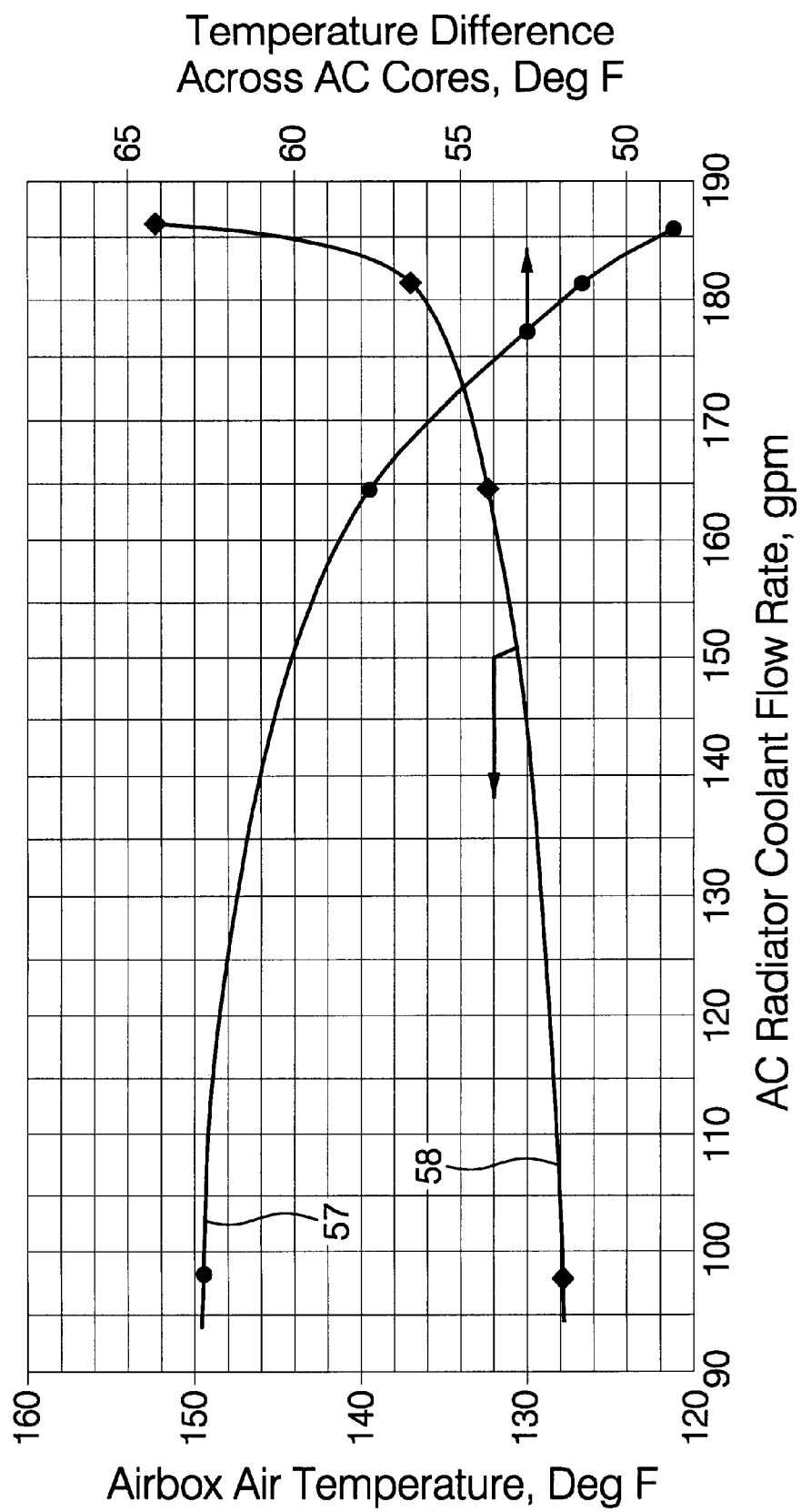
FIG. 2 is a graphical plot of aftercooler radiator coolant flow rate versus aftercooler outlet (airbox) air temperature and the differential coolant temperature across the aftercooler.

FIG. 2 shows graphically the effects of reducing the coolant flow rate through the aftercooler radiators on the temperature difference across the aftercooler cores and the cooled engine (airbox) intake air temperature out of the aftercoolers. Curve 57 shows the increase in differential coolant temperature in degrees F as the coolant flow is reduced and curve 58 indicates the corresponding reduction in the engine inlet (airbox) air temperature at the outlet of the aftercooler cores.

The fact that reducing the flow of coolant in the aftercooler coolant loop can produce lower coolant temperatures at the aftercooler inlet appears counterintuitive when viewed from a component standpoint, as it is well known that the effectiveness of a radiator or aftercooler core increases as the coolant flow is increased. However, the fact that the method of reducing aftercooler loop flow does provide lower coolant loop temperatures and lower engine air inlet temperatures has been confirmed by application of two different mathematical methods: closed form analytic equations and system modeling computer codes. Both methods confirmed the effectiveness of the method in the aftercooler system.

This application of the inventive concepts to an actual locomotive cooling system design clearly demonstrates that decreasing the flow rate on the aftercooler loop and thus increasing the difference between the inlet and outlet water temperatures at the aftercooler core can increase the cooling capacity of the loop and decrease the airbox (engine inlet) air temperature appreciably.

In the example described above, increasing the number of passes of the aftercooler radiators and hence increasing their resistance to flow decreases the aftercooler loop flow rate. Any other method that would decrease the aftercooler flow rate and increase the temperature difference between the inlet and outlet of the aftercooler core would be effective to yield the same result. This is a primary basis for application of the present invention.

The methods or ways to achieve this end result can be placed in two groups: namely static and dynamic. In the static methods, the characteristics of components are selected in a way to achieve the desired low flow rate at particular engine operating and environmental conditions. The system of FIG. 1 is an example of the static group. At operating conditions different from those specified, the system does not change the characteristics of components so it is not always at an optimum state.

Figure 3:
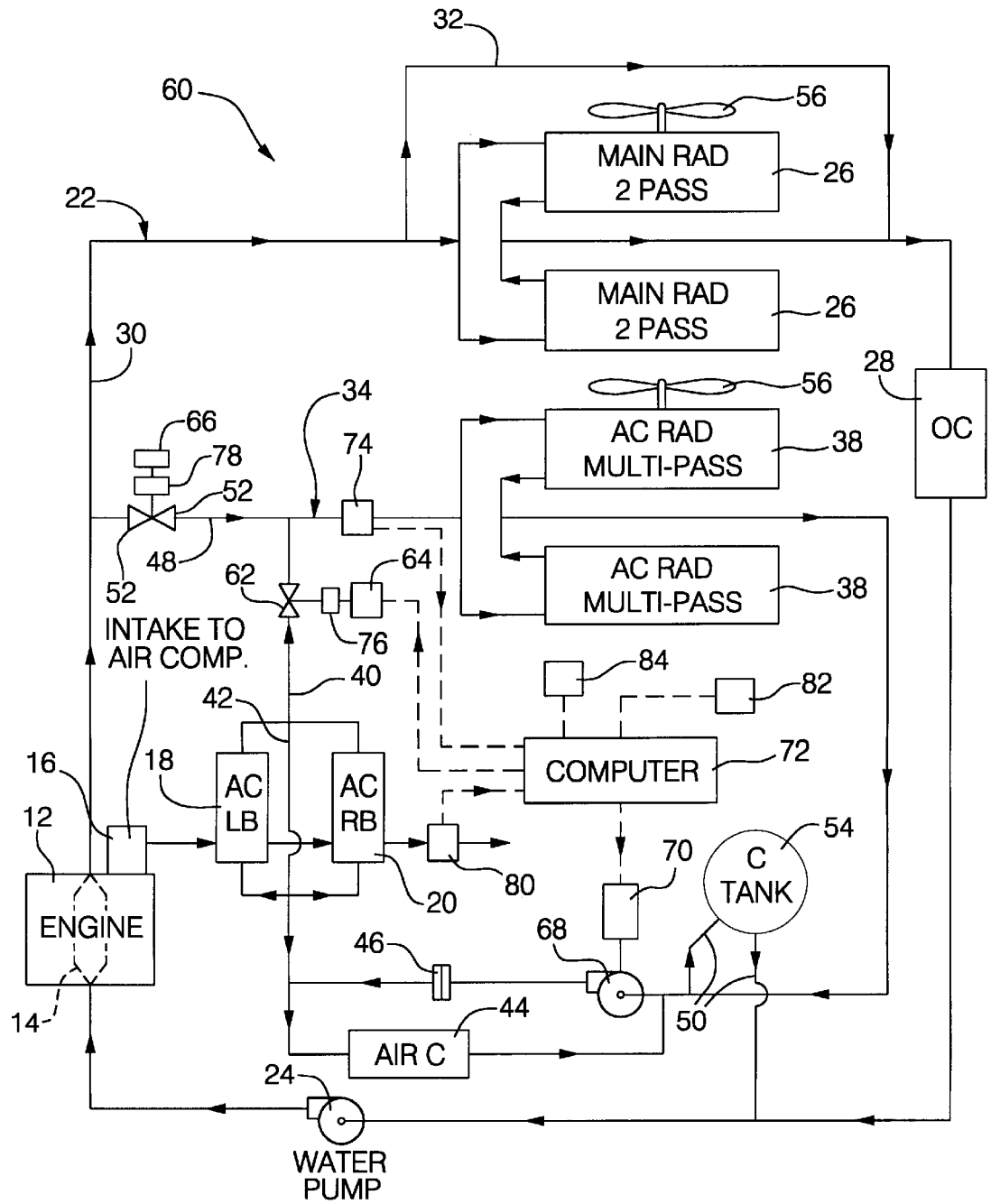
FIG. 3 is a diagram similar to FIG. 1 but showing main components of an alternative embodiment of the invention.

In the dynamic methods, one or more of the system components are modified, by an actuator, under the control of a computer which can make modification decisions, using a system model in its memory based on measurements of properties of the working fluids at selected locations of the cooling system. FIG. 3 shows the schematic description of such a locomotive engine cooling system forming a dynamic embodiment of the present invention and generally indicated by reference numeral 60.

Engine cooling system 60 includes many of the components and features of the embodiment of FIG. 1 so that in FIG. 3 like reference numerals are used to indicate like parts as to which further explanation is not needed. Additional components are also provided including a variable area flow control valve 62 in the aftercooler coolant loop 34 and actuators 64, 66 for changing the openings of the flow control valve 62 and the linking valve 52. A coolant pump 68 having a variable speed electric drive motor and controller 70 optionally replaces the previous engine driven pump. A computer 72 is connected to the valve actuators 64, 66 and/or the pump motor controller 70 for controlling these components in accordance with a preset or changeable process or program in response to selected engine and system related parameters. Thus, the computer may receive information from sensors in the cooling system, such as a loop sensor 74 for measuring a condition such as temperature or flow of the coolant in the aftercooler loop, position sensors 76, 78 for the valves 62, 52, a sensor 80 for sensing the aftercooler air outlet (engine intake) temperature, an ambient air sensor 82 and one or more additional sensors 84 for sensing any other desired engine or system parameters.

For operation of the cooling system, the computor memory includes a performance model of the system for comparison by the computor in reading the sensed parameter signals and sending signals to the actuators 64, 66 and/or the pump motor controller 70 to position the valves 52, 62 and/or vary the pump speed to obtain the desired water flow rate for the engine operating conditions.

The system components shown and described may of course be modified or substituted for by other components or elements for accomplishing the purposes of the invention. For example any suitable form of valve or flow resistance element may be utilized in the system to adjust the flow rate in the aftercooling loop as long as the operation of the linking valve 52 in directing coolant to the aftercooler radiators 38 for controlling engine temperatures is not interfered with. The electrically driven water pump 68 and the flow control valve 62 may be used individually or together to obtain the desired water flow. Other form of water pump drives may alternatively be used. Also other control strategies for optimizing the aftercooler water flow may be employed in carrying out the invention. Examples are prepared tables from previous data or predictive methodology, or a system model working on time based data measured by the sensors in the system.

Various alternative mechanisms, devices and components may be substituted in the system for accomplishing the purposes indicated without departing from the principles of the invention. Thus, any suitable types of motors, actuators, valves or other devices may be used where applicable. Also, any known form of system model based on tests or predictive analyses and involving steady or transient system simulations may be employed.

A system in accordance with FIG. 3 was designed in which the use of four pass aftercooler radiators 38 provides effective cooling of the engine under all expected engine operating conditions. The first linking conduit is connected to the main coolant loop 22 between the engine and the main radiators 26. This is a desirable location because the main loop temperatures are highest at the outlet from the engine and the pressure at this point is sufficiently higher than the aftercooler loop pressure to provide sufficient flow from the engine through the aftercooler radiators when needed.

Figure 4:
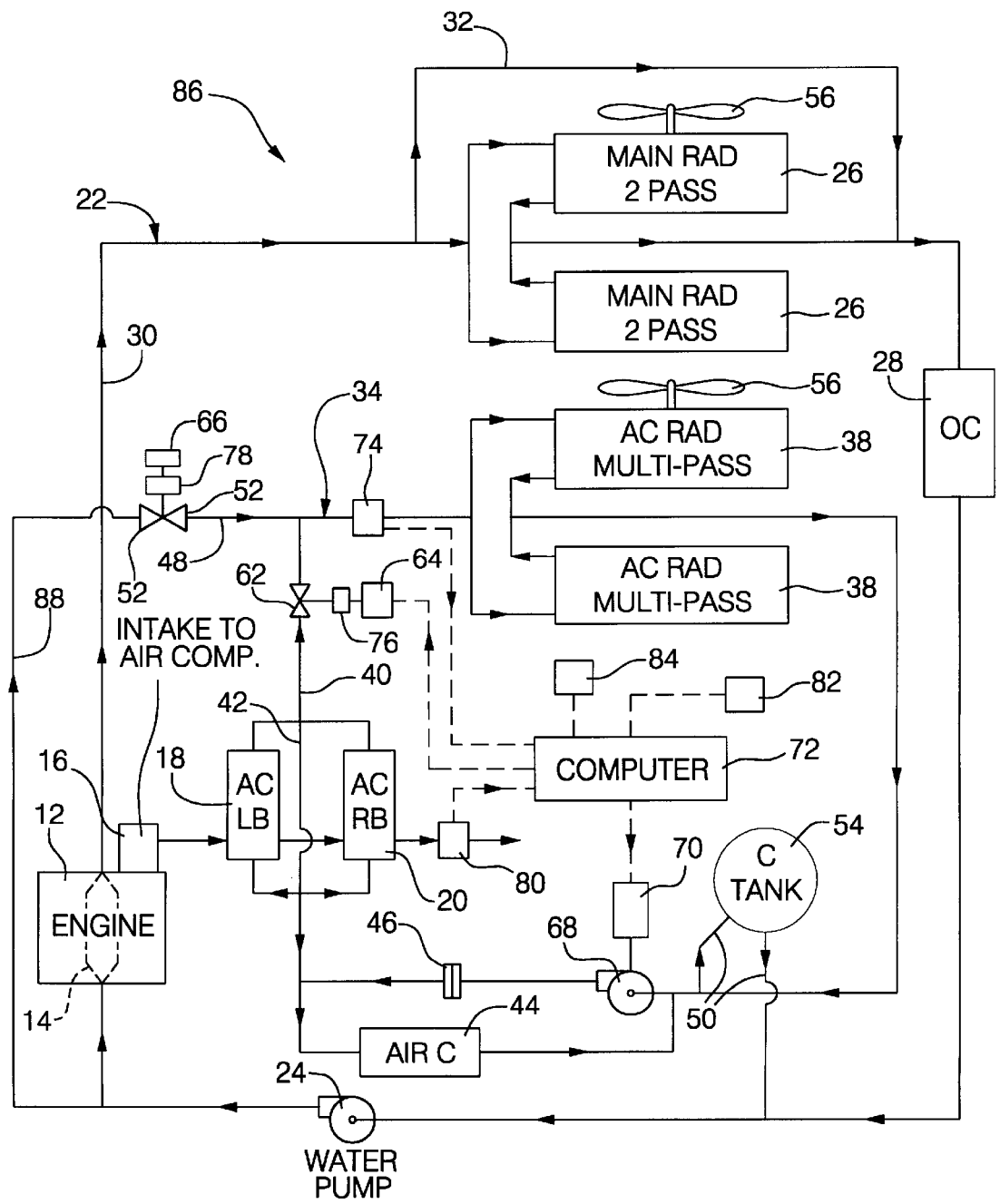
FIG. 4 is a partial diagram showing modified portions of an alternative embodiment similar to the system of FIG. 3.

FIG. 4 shows a modified portion of an alternative embodiment of engine cooling system 86. The system is similar to that of FIG. 3 and the aftercooler radiators (not shown) use the same cores as radiators 38 but they have modified headers that provide 8 pass coolant flow. In this modified system, the increased flow resistance through the 8 pass radiators causes the pressure in the aftercooler coolant loop 34 to be higher at the connection with the link valve 52 than the pressure of the main coolant loop at the engine outlet. This would prevent flow to the aftercooler coolant loop through the first linking conduit 48. To remedy this, system 86 disconnects the first linking conduit 48 and link valve 52 from the engine outlet portion of the main coolant loop 22 and instead connects the valve 52 directly through a linking conduit 88 with the main coolant loop between the outlet of the main pump 24 and the engine inlet. Here, the coolant pressure is sufficiently higher to provide adequate coolant flow from the main coolant loop 22 to the aftercooler coolant loop 34 when the valve 52 is opened. This is true even though the engine inlet coolant temperature is lower than at the engine outlet, since the temperature difference across the engine is relatively small and the cooling capacity of the 8 pass radiators provides adequate cooling of the main loop coolant bypassed to the aftercooler loop when additional engine cooling is needed.

It should be apparent that the linking connections between the main and aftercooler loops may be changed as needed to obtain the needed coolant flow between the loops when the linking valve is open. Other means of controlling flow in the system may also be utilized as may best carry out the system functions. However, simplification of the system and the use of available components are preferable where possible in order to minimize cost. Thus the modified systems described can provide improved engine efficiency and emissions control while limiting the use of costly new components.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. An internal combustion engine having coolant passages therethrough, a compressor for increasing the density of inlet air thereto, an aftercooler for cooling the inlet air from the compressor and cooling apparatus comprising:
   a main coolant loop including a main pump, a main radiator and a main coolant conduit connecting the main pump, the engine coolant passages and the main radiator for unidirectional circulation of a liquid coolant;
   an aftercooler coolant loop including an aftercooler pump, an aftercooler radiator and an aftercooler conduit connecting the aftercooler pump, the aftercooler and the aftercooler radiator for unidirectional circulation of a liquid coolant, the components of the aftercooler coolant loop providing a lower coolant temperature therein than the coolant temperature provided by the components of the main coolant loop therein when coolant flows of the main and aftercooler coolant loops are maintained separate;
   a first linking conduit connecting a higher pressure portion of the main coolant loop with a lower pressure portion of the aftercooler coolant loop ahead of the aftercooler radiator;
   a second linking conduit connecting the aftercooler coolant loop with the main coolant loop after the respective radiators;
   a valve in one of the linking conduits and operable between closed and open positions to respectively prevent or permit-coolant flow from the main pump in the main loop through the aftercooler radiators in the aftercooler loop and back to the main loop into the main pump inlet; and
   a control responsive to engine and control related parameters to activate the valve to primarily maintain engine temperature below a maximum limit and to secondarily maintain a desired maximum coolant temperature differential across the aftercooler radiator.

2. An engine as in claim 1 wherein said first linking conduit extends from the main coolant loop between the main pump and the main radiator.

3. An engine as in claim 1 wherein said second linking conduit connects a coolant tank with both coolant loops.

4. An engine as in claim 1 wherein said aftercooler pump is driven by an electric motor.

5. An engine as in claim 1 wherein said control includes means for controlling at least one of an actuator for a flow control valve in the aftercooler loop and a variable speed drive motor for the aftercooler pump.

6. An internal combustion engine having coolant passages therethrough, a compressor for increasing the density of inlet air thereto, an aftercooler for cooling the inlet air from the compressor and cooling apparatus comprising:
   a main coolant loop including a main pump, a main radiator and a main coolant conduit connecting the main pump, the engine coolant passages and the main radiator for unidirectional circulation of a liquid coolant;
   an aftercooler coolant loop including an aftercooler pump, an aftercooler radiator connected for four coolant passes in series, and an aftercooler conduit connecting the aftercooler pump, the aftercooler and the aftercooler radiator for unidirectional circulation of a liquid coolant, the components of the aftercooler coolant loop providing a lower coolant temperature therein than the coolant temperature provided by the components of the main coolant loop therein when coolant flows of the main and aftercooler coolant loops are maintained separate;
   a first linking conduit extending from the main coolant loop between the engine and the main radiator and connecting a higher pressure portion of the main coolant loop with a lower pressure portion of the aftercooler coolant loop ahead of the aftercooler radiator;
   a second linking conduit connecting the aftercooler coolant loop with the main coolant loop after the respective radiators;
   a valve in one of the linking conduits and operable between closed and open positions to respectively prevent or permit coolant flow from the main pump in the main loop through the aftercooler radiators in the aftercooler loop and back to the main loop into the main pump inlet; and
   a control responsive to engine and control related parameters to activate the valve to primarily maintain engine temperature below a maximum limit and to secondarily maintain a desired maximum coolant temperature differential across the aftercooler radiator.

7. An internal combustion engine having coolant passages therethrough, a compressor for increasing the density of inlet air thereto, an aftercooler for cooling the inlet air from the compressor and cooling apparatus comprising:
   a main coolant loop including a main pump, a main radiator and a main coolant conduit connecting the main pump, the engine coolant passages and the main radiator for unidirectional circulation of a liquid coolant;

an aftercooler coolant loop including an aftercooler pump, an aftercooler radiator connected for eight coolant passes in series, and an aftercooler conduit connecting the aftercooler pump, the aftercooler and the aftercooler radiator for unidirectional circulation of a liquid coolant, the components of the aftercooler coolant loop providing a lower coolant temperature therein than the coolant temperature provided by the components of the main coolant loop therein when coolant flows of the main and aftercooler coolant loops are maintained separate;

a first linking conduit extending from the main coolant loop between the main pump and the engine and connecting a higher pressure portion of the main coolant loop with a lower pressure portion of the aftercooler coolant loop ahead of the aftercooler radiator;

a second linking conduit connecting the aftercooler coolant loop with the main coolant loop after the respective radiators;

a valve in one of the linking conduits and operable between closed and open positions to respectively prevent or permit coolant flow from the main pump in the main loop through the aftercooler radiators in the aftercooler loop and back to the main loop into the main pump inlet; and a control responsive to engine and control related parameters to activate the valve to primarily maintain engine temperature below a maximum limit and to secondarily maintain a desired maximum coolant temperature differential across the aftercooler radiator.

8. An internal combustion engine having coolant passages therethrough, a compressor for increasing the density of inlet air thereto, an aftercooler for cooling the inlet air from the compressor and cooling apparatus comprising:

a main coolant loop including a main pump, a main radiator and a main coolant conduit connecting the main pump, the engine coolant passages and the main radiator for unidirectional circulation of a liquid coolant;

an aftercooler coolant loop including an aftercooler pump, an aftercooler radiator and an aftercooler conduit connecting the aftercooler pump, the aftercooler and the aftercooler radiator for unidirectional circulation of a liquid coolant, the components of the aftercooler coolant loop providing a lower coolant temperature therein than the coolant temperature provided by the components of the main coolant loop therein when coolant flows of the main and aftercooler coolant loops are maintained separate;

a first linking conduit connecting a higher pressure portion of the main coolant loop with a lower pressure portion of the aftercooler coolant loop ahead of the aftercooler radiator;

a second linking conduit connecting the aftercooler coolant loop with the main coolant loop after the respective radiators;

a valve in one of the linking conduits and operable between closed and open positions to respectively prevent or permit coolant flow from the main pump in the main loop through the aftercooler radiators in the aftercooler loop and back to the main loop into the main pump inlet;

a control responsive to engine and control related parameters to activate the valve to primarily maintain engine temperature below a maximum limit and to secondarily maintain a desired maximum coolant temperature differential across the aftercooler radiator; and a flow control valve in said aftercooler loop between the second and first linking conduits in the direction of coolant flow.

9. A method of modifying an internal combustion engine having coolant passages therethrough, a compressor for increasing the density of inlet air to the engine, an aftercooler for cooling the engine inlet air from the compressor and cooling apparatus including a main coolant loop for cooling the engine, an aftercooler coolant loop for cooling the aftercooler and flow controllable linking conduits between the loops for increasing engine cooling when desired by directing a portion of the coolant from the main coolant loop through aftercooler radiators in the aftercooler coolant loop, wherein said method comprises:

closing flow through the inking conduits for separate operation of the cooling loops except as required to maintain engine coolant temperature below an established maximum; and reducing flow in the aftercooler coolant loop during separate operation thereof to obtain maximum cooling of the inlet air in the aftercooler by maximizing optimum coolant temperature differences across the aftercooler and the aftercooler radiators.

* * * * *